(12) United States Patent
Haws et al.

(10) Patent No.: US 7,195,177 B2
(45) Date of Patent: Mar. 27, 2007

(54) METHOD AND APPARATUS FOR HUMIDITY CONTROL WITHIN A HOUSING

(75) Inventors: James L. Haws, McKinney, TX (US); Ronald J. Richardson, Dallas, TX (US)

(73) Assignee: Raytheon Company, Waltham, MA (US)

( * ) Notice: Subject to any disclaimer, the term of this patent is extended or adjusted under 35 U.S.C. 154(b) by 630 days.

(21) Appl. No.: 10/465,115

(22) Filed: Jun. 18, 2003

(65) Prior Publication Data

US 2004/0255598 A1 Dec. 23, 2004

(51) Int. Cl.
*F24F 11/00* (2006.01)
*B01F 3/02* (2006.01)
*G08B 21/00* (2006.01)

(52) U.S. Cl. .................. 236/44 A; 236/44 R; 340/602

(58) Field of Classification Search .............. 236/44 R, 236/44 A, 44 C, 44 E; 340/602, 604
See application file for complete search history.

(56) References Cited

U.S. PATENT DOCUMENTS

| | | | | |
|---|---|---|---|---|
| 3,796,615 A | * | 3/1974 | Westeren et al. ........... 148/223 |
| 4,642,715 A | | 2/1987 | Ende ........................... 360/97 |
| 4,755,031 A | | 7/1988 | Daviau et al. .............. 350/588 |
| 5,257,008 A | | 10/1993 | Elamin ....................... 340/540 |
| 2003/0156871 A1 | | 8/2003 | Carlson et al. ............. 399/390 |

FOREIGN PATENT DOCUMENTS

| | | |
|---|---|---|
| GB | 1156698 | 8/1966 |
| JP | 03165812 A | 7/1991 |

OTHER PUBLICATIONS

European Search Report, Application No. PCT/04253615.1—2006; reference # JL4463; 3 pages, Oct. 7, 2005.
Patent Abstracts of Japan, vol. 015, No. 403 (C-0875), Dec. 15, 1991.

* cited by examiner

*Primary Examiner*—Chen Wen Jiang
(74) *Attorney, Agent, or Firm*—Baker Botts L.L.P.

(57) ABSTRACT

An apparatus includes a housing having a chamber, having a replaceable part which has a moisture adsorption characteristic and which is in communication with the chamber, and having a humidity monitoring section which is responsive to the humidity within the chamber. A method of controlling humidity within a chamber in a housing includes: providing a replaceable part which has a moisture adsorption characteristic and which is in communication with the chamber, and monitoring the humidity within the chamber using a humidity monitoring section which is responsive to the humidity within the chamber.

17 Claims, 2 Drawing Sheets

METHOD AND APPARATUS FOR HUMIDITY CONTROL WITHIN A HOUSING

TECHNICAL FIELD OF THE INVENTION

This invention relates in general to humidity control and, more particularly, to humidity control within a housing.

BACKGROUND OF THE INVENTION

There are a variety of applications in which it is desirable to maintain a degree of humidity control. One category of these applications involves devices with electronic circuitry provided within some form of closed housing. The humidity within the housing needs to be controlled in order to limit or avoid corrosion of metal within the circuitry, or condensation of moisture on exposed radio frequency (RF) circuit lines. As one specific example of this type of application, there is a need to control humidity in electronic assemblies which contain RF gallium arsenide (GaAs) monolithic microwave integrated circuit (MMIC) devices, in order to enhance the overall reliability of the MMIC devices.

Phased array antenna systems often involve the use of RF MMIC devices. In such an antenna array, which is often referred to in the art as an active electronically scanned array (AESA), the spacing between antenna elements is determined by the operational frequency of the system. Consequently, as the operational frequency increases, the inter-element spacing between adjacent antenna elements decreases, which in turn decreases the size of the array and the amount of space available for the circuitry associated with each antenna element. In a traditional low-frequency antenna array, the array is relatively large, and there is a fair amount of space available in association with each antenna element. Due in part to the amount of available space, each MMIC is typically disposed within its own separate hermetic package. However, as the operating frequency increases, the use of a separate hermetic package for separate components becomes difficult or impossible. For example, in an active electronically scanned array (AESA) antenna operating in the Ka frequency band at approximately 35 GHz, the spacing between adjacent antenna elements will typically be about one-half of a wavelength, or in other words only about 0.175 inch.

One way in which moisture can enter an electronic package is to leak past a moisture seal, such as an O-ring. An entirely different way in which moisture can enter such a package is through permeation. Permeation refers to the passage of a molecule through a solid barrier, and is different from leakage. In particular, permeation occurs when gas molecules dissolve into one side of a material such as a housing wall, diffuse through that material, and then evaporate from the far side of the material. In an AESA having a housing which includes a radome, the radome is often made from a material which is more susceptible to moisture permeation that other portions of the housing.

SUMMARY OF THE INVENTION

From the foregoing, it may be appreciated that a need has arisen for an improved method and apparatus for controlling humidity within a closed space. According to one form of the invention, an apparatus includes a housing which has a chamber, a replaceable part which has a moisture adsorption characteristic and which is in communication with the chamber, and a humidity monitoring section which is responsive to the humidity within the chamber.

According to a different form of the invention, a method of controlling humidity within a chamber in a housing includes: providing a replaceable part which has a moisture adsorption characteristic and which is in communication with the chamber, and monitoring the humidity within the chamber using a humidity monitoring section which is responsive to the humidity within the chamber.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
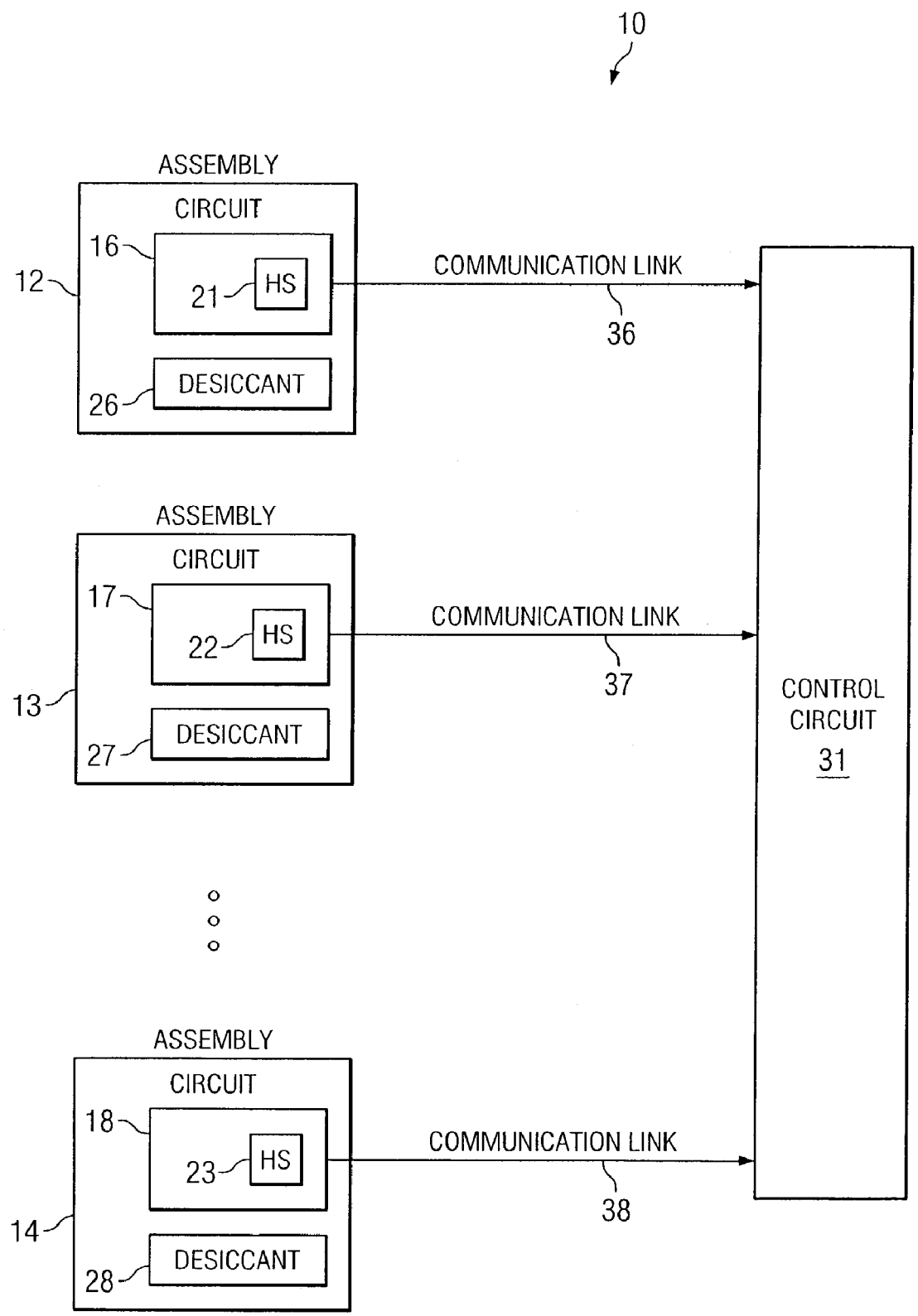
FIG. 1 is a block diagram of a system which embodies aspects of the present invention, and which includes a control circuit that controls a plurality of assemblies which each have circuitry therein.

FIG. 1 is a block diagram of a system 10 which embodies aspects of the present invention. The system 10 includes a plurality of assemblies, three of which are shown at 12–14. The assemblies 12–14 each have a housing with a chamber therein, and each chamber contains a respective electronic circuit 16–18. In the disclosed embodiment, the electronic circuit 16 includes the electrical function of a phased array antenna of a known type, which operates in the Ka frequency band at a frequency of approximately 35 GHz, and which thus has its adjacent antenna elements spaced by only about 0.175 inch. The electronic circuits 17–18 may also include the electrical function of a phased array antenna, or may be some other type of electronic circuit.

Electronic circuits 16–18 each include a respective electronic humidity sensor 21–23, which can sense the relative humidity within the associated chamber. One suitable humidity sensor is available commercially as part number SHT11 from Sensirion AG of Zurich, Switzerland. This particular humidity sensor can determine and report the actual humidity level, as opposed to just determining and reporting whether or not the humidity level is above a predetermined threshold. However, it would alternatively be possible to use any other suitable electronic humidity sensor, including a sensor of the type which simply indicates whether or not the ambient humidity is above a threshold, but cannot indicate the actual humidity level.

Each of the assemblies 12–14 has therein a respective desiccant 26–28, which adsorbs moisture within the chamber in that assembly. Each desiccant 26–28 will adsorb moisture over time, until it has expended its moisture-adsorbing ability and needs to be replaced. Accordingly, the desiccants 26–28 can each be replaced, in a manner described in more detail later.

The circuits 16–18 are each coupled to a central control circuit 31 by a respective communication link 36–38. Each communication link 36–38 can involve one or more different types of links that each support communication, such as cables, wireless links, and so forth. The control circuit 31 may be in a physical location which is very remote from one or more of the assemblies 12–14. As one hypothetical example, which involves a military context, the assembly 12 could be provided on some type of mobile military vehicle such as a tank, and the control circuit 31 could be disposed in a command headquarters which is located many miles from the tank. In that situation, at least a portion of the communication link 36 between the tank and headquarters would be implemented with a wireless link which involves the transmission of radio-frequency signals, either directly or through a satellite.

As mentioned above, the humidity sensors 21–23 each monitor the humidity level within the chamber of a respective assembly 12–14. The desiccants 26–28 each adsorb moisture in order to keep the humidity levels relatively low within each chamber, until the time when the desiccant has adsorbed so much moisture that it cannot continue to efficiently adsorb more moisture, and therefore experiences a progressive reduction in its capability to adsorb further moisture. When any of the desiccants 26–28 reaches this state of decreasing adsorption capability, the humidity in the associated chamber will begin to rise. Using the humidity sensors 21–23, the control circuit 31 can monitor the humidity within each chamber, and determine whether the humidity in any chamber has exceeded a predetermined threshold level. When the humidity in any given chamber exceeds the threshold, it will typically be because the desiccant in that chamber needs to be replaced. In that event, the control circuit 31 will provide a service crew with a list of the specific assemblies in which the desiccant needs to be replaced, and the current locations of those assemblies.

In the disclosed embodiment, the control circuit 31 also evaluates the extent to which the humidity in each chamber is in excess of the specified threshold, and prioritizes assemblies in the list given to the service crew, so that the assemblies appear in an order running from those with the largest degree of excess humidity to those with the smallest degree of excess humidity. This prioritization can also take one or more other factors into account, such as the current operational context of a given assembly. For example, if an assembly with a lower degree of excess humidity is currently in a combat situation, it could be assigned a higher level of priority than another assembly which has a higher degree of excess humidity but is not currently in a combat situation. The service crew would service the assemblies in approximately the same order in which they appear on the list, so that assemblies assigned the highest priority would be serviced first.

If the humidity sensor was alternatively the type of sensor which can determine whether the humidity is above a threshold, but cannot determine the degree to which the humidity level is above the threshold, the control circuit 31 could output a list of all assemblies in which the detected humidity is in excess of a predetermined threshold. This list could be produced with no prioritization of the assemblies in the list, or with a prioritization based on one or more criteria other than humidity, such as the current operational context of each assembly.

Figure 2:
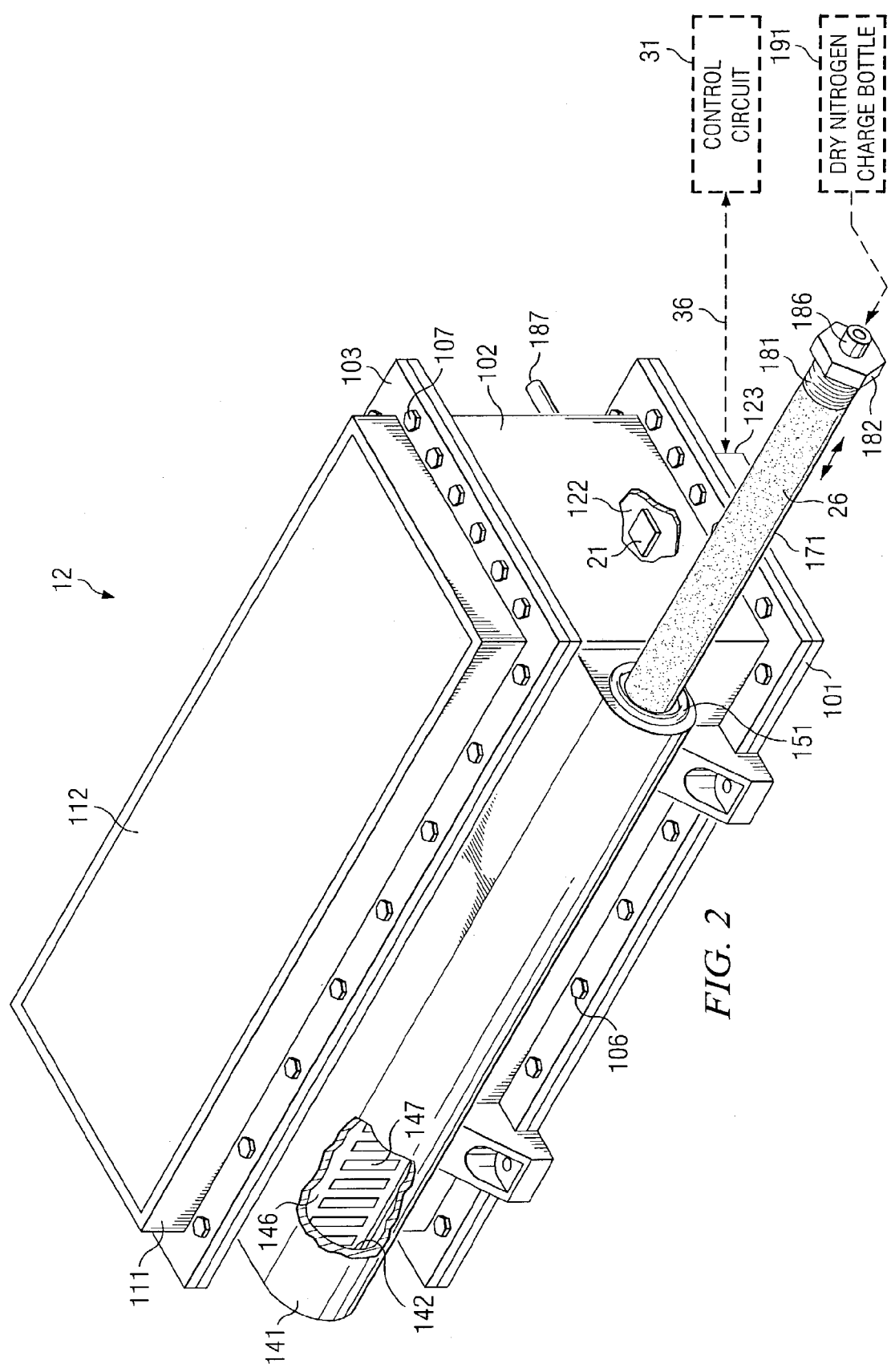
FIG. 2 is a diagrammatic fragmentary perspective view which shows one of the assemblies of FIG. 1 in more detail, and which also shows a control circuit and a communication link from the system of FIG. 1.

FIG. 2 is a diagrammatic fragmentary perspective view which shows in greater detail the assembly 12 of FIG. 1, and which also shows the control circuit 31 and communication link 36 of FIG. 1. As discussed above, the assembly 12 has a housing with a chamber therein. With reference to FIG. 2, the housing is defined by a bottom part 101, a central part 102, and a top part 103. The central part 102 has a rectangular opening which extends vertically through it, and which effectively serves as the chamber in that assembly. The bottom part 101 is fixedly secured to the central part 102 by a plurality of bolts 106, and the top part 103 is fixedly secured to the central part 102 by a plurality of bolts 107. A not-illustrated O-ring is provided between the parts 101 and 102, and another not-illustrated O-ring is provided between the parts 102 and 103, in order to resist the entry of moisture into the housing. The top part 103 includes a frame 111, and a radome 112 which is fixedly and sealingly mounted within the frame 111. As mentioned above, the circuit 16 within the assembly 12 includes a phased array antenna of a known type. The antenna elements transmit and/or receive radiation through the radome 112, in a manner which is known in the art.

With respect to the circuit 16 which is disposed within the chamber in assembly 12, a portion of a circuit board is visible at 122 in FIG. 2, and this circuit board has the humidity sensor 21 mounted thereon. The bottom part 101 of the housing has an electrical connector 123 mounted thereon, a portion of this connector is visible in FIG. 2. The bottom part 101 may have additional electrical connectors which are not visible in FIG. 2, and it would also be possible for connectors to be provided at other locations on the assembly 12, for example on the central part 102 thereof. To the extent that connectors are provided, each connector would include some form of moisture seal, such as an appropriate O-ring. As shown in broken lines in FIG. 2, the communication link 36 is coupled to the connector 123, in order to operationally couple the control circuit 31 to the circuit disposed within the assembly 12.

The central part 102 has, on one side thereof, a projection 141 of approximately semi-cylindrical shape, which extends the full length of the central part 102. A cylindrical opening 142 opens into the projection 141 from one end thereof, and extends most of the length of the projection 141. With reference to the orientation of the assembly 12 which is shown in FIG. 2, the right end of the opening 142 has internal threads, which are not visible in the drawing. The central part 102 of the housing has a wall portion 146, which is disposed between the opening 142 and the chamber within the assembly 12. The wall portion 146 has a plurality of openings 147 through it, which provide communication between the opening 142 and the chamber. In FIG. 2, the outer surface of the projection 141 has a groove which concentrically encircles the open end of the opening 142, and an O-ring 151 is seated within the groove.

The assembly 12 also includes a replaceable cartridge 171. The cartridge 171 has a cylindrical portion, which is the desiccant 26. In the disclosed embodiment, the desiccant 26 is a molecular sieve desiccant of a known type. In particular, the desiccant 26 has a uniform network of synthetic zeolite crystalline pores and cavities. This desiccant will not give up previously-adsorbed moisture as readily as other desiccants (such as a silica gel), and has a higher adsorption equilibrium capacity for water vapor under low humidity conditions than other desiccants (such as a silica gel). The pore size in the desiccant 26 of the disclosed embodiment is about 4 Angstroms. Alternatively, however, the desiccant 26 could be implemented with some other suitable moisture-adsorbing material, such a silica gel.

For any given application, persons skilled in the art can select an appropriate size and composition for the desiccant 26, in order to ensure that its expected operational lifetime will be suitable for that application. In the disclosed embodiment, the size and composition of the desiccant 26 have been selected so that, under normal conditions, the desiccant 26 should keep the humidity within the assembly 12 below a selected threshold for at least a year.

At one end, the cartridge 171 has an end portion which includes a threaded cylindrical portion 181 and a hexagonal flange 182. The cylindrical portion 181 is provided between and is fixedly coupled to each of the desiccant 26 and the flange 182. A unidirectional check valve 186 is installed in the center of the end portion of the cartridge 171, and communicates with the desiccant 26. The valve 186 will permit a pressurized gas to flow into the assembly 12 through the desiccant 26, but resists any gas flow in the opposite direction. A unidirectional relief valve 187 is installed in a wall of the central part 102. In response to excess gas pressure within the chamber in the assembly 12, the relief valve 187 permits gas to flow out of the chamber through the valve 187 to the exterior of the assembly 12. However, the valve 187 resists any gas flow in the opposite direction. Although the relief valve 187 in the disclosed embodiment is a unidirectional valve, it could alternatively be a bidirectional valve.

In FIG. 2, the cartridge 171 is shown in a partly withdrawn state, for the purpose of clarity. During normal operation, the desiccant 26 of the cartridge 171 would be disposed completely within the opening 142 in the projection 141, and the threaded cylindrical portion 181 would be engaged with the not-illustrated internal threads at the end of the opening 142. The hexagonal flange 182 would have one side surface firmly and sealingly engaging the O-ring 151, in order to provide a seal which resists the entry of moisture into the opening 141 from externally of the assembly 12.

Although the cartridge 171 in the disclosed embodiment is held in place by cooperation of the external threads on the cylindrical portion 181 and the not-illustrated internal threads at the end of the opening 142, it would alternatively be possible to omit both sets of threads and to secure the cartridge in place in some other manner. For example, the flange 182 could have several circumferentially spaced holes extending through it, the projection 141 could have several threaded holes provided at circumferentially spaced locations around the open end of the opening 142, and several bolts could each extend through a respective hole in the flange 182 and threadedly engage a respective threaded hole in the projection 141.

Over time, small amounts of water vapor will enter the assembly 12, either by leaking past one of the seals, or by permeating through the material of the housing. As is known in the art, permeation is different from leakage, and refers to the passage of a molecule through a solid barrier. In particular, permeation occurs when gas molecules dissolve into one side of a material such as a housing wall, diffuse through that material, and then evaporate from the far side of the material.

Since the openings 147 provide communication between the opening 142 and the chamber within the assembly, the desiccant 26 can adsorb small amounts of moisture which manage to enter the chamber due to leakage or permeation. After at least a year of normal operation, however, the desiccant 26 will reach a point where it has adsorbed so much moisture that it cannot continue to efficiently adsorb additional moisture, and therefore experiences a reduction in its ability to adsorb further moisture. As a result, the humidity level within the assembly 12 will begin to slowly and progressively increase, and this rising humidity level will be detected by the humidity sensor 21 and relayed to the control circuit 31.

The detection of the humidity level by the humidity sensor may be carried out by periodically executing some form of built-in test (BIT) routine that interrogates the sensor. This test routine may be carried out independently within each assembly at the assembly level, or may be part of a system-level test that includes a number of assemblies and also the control circuit. When the humidity level in an assembly is found to be in excess of a predetermined threshold, this information is relayed to the control circuit 31, along with a unique identification code assigned to that particular assembly. In the disclosed embodiment, each humidity sensor determines the actual humidity level, and this information is sent to the control circuit 31. Alternatively, if a different type of humidity sensor was used, which only determined whether or not the humidity was above a threshold, the control circuit would simply be notified that the humidity had exceeded the threshold.

The control circuit 31 will then notify a service crew that the cartridge 171 in a specified assembly needs to be replaced. In a large system, at any given point in time, there will typically be a number of assemblies which are in need of cartridge replacement. The control circuit 31 can prioritize the assemblies in the list, based on one or more criteria. For example, if the control circuit 31 has been provided with information indicating the actual humidity level in each assembly, the control circuit can determine the extent to which the actual humidity level exceeds a threshold in each assembly, and higher degree of priority can be given to assemblies in which this difference is larger. Another criteria which can be used for prioritization is the current operational context of each assembly needing service. For example, in a military context, if some of the assemblies are currently in a combat situation and others are not, a higher degree of priority can be given to the assemblies involved in the combat situation.

The service crew will then select from the list an assembly which has a relatively high priority, and will go to that assembly with a service kit containing a replacement cartridge 171 and also a charge bottle 191 filled with pressurized dry nitrogen. The service crew will use a wrench to rotate the hexagonal flange 182 on the previously-installed cartridge 171, in order to disengage the threads 181 from the internal threads of the opening 142. The original cartridge 171 is then extracted from the assembly, and either discarded or saved for recycling. The replacement cartridge 171 is inserted into the opening 141, and is rotated so as to engage its threads 181 with the internal threads of the opening 142. The wrench is then engaged with the hexagonal flange 182, and is used to rotate the replacement cartridge 171 until a surface on one side of the flange 182 is firmly and sealingly engaging the O-ring 151, in order to provide a moisture-resistant seal.

As this cartridge replacement takes place, some moisture-laden air may enter the opening 142. Therefore, after the cartridge 171 has been replaced, the service crew couples to the valve 186 a fitting on the dry nitrogen charge bottle 191. When this fitting is physically coupled to the valve 186, a valve within the fitting is physically opened, and permits the pressurized nitrogen within the bottle 191 to reach the valve 186. The pressure of the dry nitrogen opens the valve 186, and causes a quantity of the dry nitrogen gas from the bottle 191 to flow through the valve 186, the desiccant 26, the opening 141, and the openings 147, and into the chamber within the assembly 12. As this occurs, moisture-laden air which may have entered the opening 141 during the cartridge replacement procedure is forced through the openings 147 and into the chamber, and is then forced out of the chamber through the relief valve 187.

When the pressure within the bottle 191 decreases to a point where it is no longer sufficient to keep the valve 186 open, the valve 186 will automatically close. By this point in time, the opening 142 and the chamber in the assembly 12 will both have been substantially filled with dry nitrogen gas from the bottle 191, with little residual air or water vapor.

The present invention provides a number of advantages. One such advantage results from the provision of a low permeability housing containing a desiccant to adsorb moisture, along with electronic sensing and monitoring of humidity within the housing. This approach provides a non-hermetic solution to humidity control, which can provide a level of humidity control satisfactory for applications that would otherwise need a hermetic solution, and which is particularly advantageous in certain applications where a hermetic approach is difficult or impossible, such as a package for a very high frequency antenna array. By electronically monitoring humidity, a central facility can efficiently monitor hundreds of similar devices, and can easily identify those in which humidity levels have become problematic. A service crew is dispatched to service specific devices in which the desiccant needs to be replaced. This has the advantage of avoiding the time and expense which would be involved in periodically sending people to manually check the humidity level within each and every device in the system, in order to determine the current humidity level in each device. Where the monitoring of humidity is carried out in a manner that determines the actual humidity level, an additional advantage is that the problematic assemblies can be prioritized based on the actual humidity level and/or other factors, such as the current situation of each assembly.

Another advantage is realized where the desiccant is configured as a cartridge that can be replaced in the field. Yet another advantage is that humidity control is effected at the assembly level, in contrast to the traditional approach of providing separate hermetic packages for each of a number of components within each assembly. This is particularly advantageous in systems such as those with high-frequency antenna arrays, where dense packaging requirements make it difficult to use traditional hermetic packages for each of a number of separate system components.

Still another advantage results from the provision of the capability to carry out a dry nitrogen purge of an assembly after replacement of the desiccant, in order to substantially expel any free moisture which may have entered the enclosure with external air as the desiccant was replaced. This purge helps to maximize the efficiency and operational lifetime of the replacement desiccant.

Although one embodiment has been illustrated and described in detail, it will be understood that various substitutions and alterations are possible without departing from the spirit and scope of the present invention, as defined by the following claims.

What is claimed is:

1. An apparatus, comprising:
    a housing having a chamber therein;
    a replaceable part which has a moisture adsorption characteristic and which is in communication with said chamber;
    a humidity monitoring section which is responsive to the humidity within said chamber;
    wherein said housing includes a wall portion which is a radome having on one side thereof a surface which is a portion of an exterior surface of said housing and having on the other side thereof a surface which bounds a portion of said chamber: and
    including a phased array antenna system which is disposed within said chamber.

2. An apparatus according to claim 1, wherein said humidity monitoring section includes a humidity sensor disposed within said chamber, and control circuitry coupled to said humidity sensor for determining the humidity within said chamber.

3. An apparatus according to claim 2, wherein said control circuitry determines whether the humidity within said chamber is in excess of a selected threshold.

4. An apparatus according to claim 2,
    including a plurality of further housings which each have therein a respective further chamber;
    including a plurality of further replaceable parts which each have a moisture adsorption characteristic and which are each in communication with a respective said further chamber;
    wherein said humidity monitoring section includes a plurality of further humidity sensors which are each disposed in a respective said further chamber; and
    wherein said control circuitry is coupled to each of said further humidity sensors for determining the humidity within each of said further chambers.

5. An apparatus according to claim 4, wherein said control circuitry determines whether the humidity within each of said chambers is in excess of a selected threshold, and provides an identification of those chambers in which the humidity is in excess of the selected threshold, prioritized by the degree of excess humidity in each such chamber.

6. An apparatus according to claim 1,
    wherein said housing has an opening through which said replaceable part can be inserted and removed; and
    including sealing structure which can selectively sealingly close said opening.

7. An apparatus according to claim 6, wherein said sealing structure includes a portion of said replaceable part.

8. An apparatus according to claim 1, wherein said replaceable part includes a portion which is one of a molecular sieve desiccant and a silica gel.

9. An apparatus according to claim 1, wherein said housing includes structure for facilitating introduction of a dry gas into said chamber.

10. An apparatus according to claim 9, wherein said dry gas is dry nitrogen.

11. An apparatus according to claim 9,
    including a first valve which is provided through said housing at a first location, which has a closed state that prevents a flow of gas between said chamber and a location external to said housing, and which has an open state that permits a flow of gas into said chamber;
    including a second valve which is provided through said housing at a second location spaced from first location, which has a closed state that prevents a flow of gas between said chamber and a location external to said housing, and which has an open state that permits a flow of gas out of said chamber; and
    including a source of dry gas which can be selectively coupled to said first valve.

12. An apparatus according to claim 11, wherein said source of dry gas includes a container having therein a quantity of said dry gas which is pressurized, and includes a fitting which facilitates a releasable coupling of said container to said first valve.

13. A method of controlling humidity comprising:
    providing a plurality of housings which each have therein a respective chamber;
    providing a plurality of replaceable parts each having a moisture adsorption characteristic and each in communication with a respective said chamber;
    monitoring the humidity within each said chamber using a humidity monitoring section which is responsive to the humidity within a respective said chamber;

wherein said monitoring includes determining whether the humidity within a respective said chamber is in excess of a selected threshold; and providing an identification of those chambers in which the humidity is in excess of the selected threshold, prioritized by the degree of excess humidity in each such chamber.

14. A method according to claim 13, wherein said humidity monitoring section includes a humidity sensor within said chamber and control circuitry coupled to said humidity sensor; and wherein said monitoring includes determining the humidity within said chamber using said control circuitry and said humidity sensor.

15. A method according to claim 13, including:

responding to a determination that the humidity is in excess of said selected threshold by replacing said replaceable part; and thereafter introducing a quantity of a dry gas into said chamber.

16. A method according to claim 15, including selecting dry nitrogen for use as said dry gas.

17. An apparatus, comprising:

a housing having a chamber therein;

a replaceable part which has a moisture adsorption characteristic and which is in communication with said chamber;

a humidity monitoring section which is responsive to the humidity within said chamber;

wherein said housing includes structure for facilitating introduction of a dry gas into said chamber including a first valve which is provided through said housing at a first location, which has a closed state that prevents a flow of gas between said chamber and a location external to said housing, and which has an open state that permits a flow of gas into said chamber;

including a second valve which is provided through said housing at a second location spaced from first location, which has a closed state that prevents a flow of gas between said chamber and a location external to said housing, and which has an open state that permits a flow of gas out of said chamber; and including a source of dry gas which can be selectively coupled to said first valve.

* * * * *